US007979242B2

(12) United States Patent
Parija et al.

(10) Patent No.: US 7,979,242 B2
(45) Date of Patent: Jul. 12, 2011

(54) METHOD AND STRUCTURE FOR PROVIDING OPTIMAL DESIGN OF TOLERANCED PARTS IN MANUFACTURING

(75) Inventors: Gyana Ranjan Parija, Poughkeepsie, NY (US); Monalisa Mohanty, Poughkeepsie, NY (US); Menachem Levanoni, Poway, CA (US)

(73) Assignee: International Business Machines Corporation, Armonk, NY (US)

( * ) Notice: Subject to any disclaimer, the term of this patent is extended or adjusted under 35 U.S.C. 154(b) by 2087 days.

(21) Appl. No.: 10/773,261

(22) Filed: Feb. 9, 2004

(65) Prior Publication Data

US 2005/0177381 A1 Aug. 11, 2005

(51) Int. Cl.
*G06F 17/10* (2006.01)
(52) U.S. Cl. ............... 703/2; 708/207; 706/13
(58) Field of Classification Search .......... 703/2; 705/8, 705/10; 434/362; 706/13, 46; 700/28, 174
See application file for complete search history.

(56) References Cited

U.S. PATENT DOCUMENTS

| | | | | |
|---|---|---|---|---|
| 6,496,741 | B1* | 12/2002 | Whiffen | 700/28 |
| 2001/0051936 | A1* | 12/2001 | Michalewicz | 706/46 |
| 2003/0220772 | A1* | 11/2003 | Chiang et al. | 703/2 |
| 2004/0059459 | A1* | 3/2004 | Baran et al. | 700/174 |

OTHER PUBLICATIONS

Yan et al., M. On-line Optimization of the Tennessee Eastman Challenge Process, Proceedings of the 1997 American Control Conference, vol. 5, Jun. 1997, pp. 2960-2965.*
Argollo De Menezes et al., M. Using Entropy-Based Methods to Study General Constrained Parameter Optimization Problems, Physica A: Statistical Mechanics and its Applications, vol. 323, May 2003, pp. 428-434.*
Kim et al. G-H. An Improved Updating Parameter Selection Method and Finite Element Model Update Using Multiobjective Optimization Technique, Mechanical Systems and Sigal Processing, vol. 18, Jan. 2004, pp. 59-78.*
Famg et al., S-C. An Efficient Computational Procedure for Solving Entropy Optimization Problems with Infinitely Many Linear Constraints, Journal of Computational and Applied Mathematics, vol. 72, Jul. 1996, pp. 127-139.*

* cited by examiner

*Primary Examiner* — Russell Frejd
(74) *Attorney, Agent, or Firm* — McGinn IP Law Group, PLLC

(57) ABSTRACT

A method and structure for a computerized method for providing an optimization solution, includes, for a process, wherein is defined a linear functional form y=f(X,c), where X comprises a set of independent variables $X=\{x_1, \ldots x_n\}$, c includes a set of functional parameters $c=\{c_1, \ldots c_n\}$, and y comprises a dependent variable, where the independent variables set X is partitioned into two subsets, $X_1$ and $X_2$, receiving data for the process and minimizing y with respect to $X_1$. Dependent variable y is maximized with respect to $X_2$, subject to a set of constraints. The maximizing y includes a global optimum for the process.

21 Claims, 7 Drawing Sheets

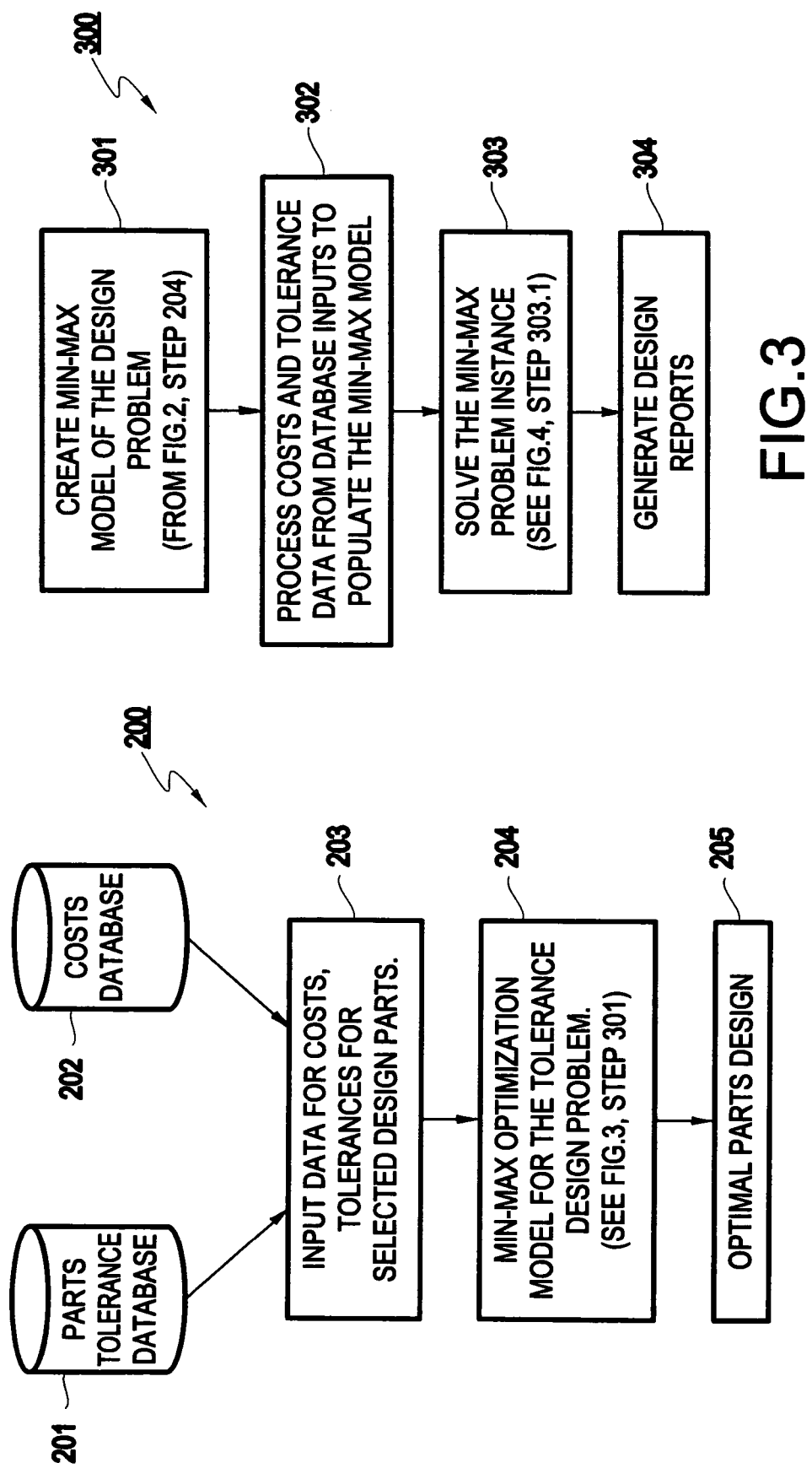

METHOD AND STRUCTURE FOR PROVIDING OPTIMAL DESIGN OF TOLERANCED PARTS IN MANUFACTURING

BACKGROUND OF THE INVENTION

1. Field of the Invention

The present invention relates generally to a computerized method and system for providing a solution to any general (non-convex) minimum-maximum problem in constrained optimization in any specific application. In an exemplary application, the technique is used to demonstrate optimal design of three-dimensional parts for manufacturing, constrained by prescribed tolerances.

2. Description of the Related Art

The present invention is introduced by first setting forth the following known construct:

Given a function $y=f(x,c)=c_1x_1+c_2x_2$, where x is a set of independent variables $x=\{x_1,x_2\}$, $x_1$ and $x_2$ are subsets of x, $c=\{c_1,c_2\}$ is a set of functional parameters, partitioned into two subsets $c_1$ and $c_2$, and y is a dependent variable, it is desired to minimize (over $x_2$) the maximum (over $x_1$) of y, subject to a linear constraint $A_{12}x_1+A_{21}x_2 \leq b_{12}$, where $A_{12}$, $A_{21}$ are sub-matrices and $b_{12}$ is a vector.

This means finding appropriate values for vectors $c_1$ and $c_2$, so as to solve:

$$\text{Min}\{c_2x_2+\text{Max } c_1x_1\}, \text{ subject to } A_{12}x_1+A_{21}x_2 \leq b_{12}.$$

This problem is, therefore, associated with a linear constraint set and a piece-wise linear objective function. FIG. 1 graphically depicts the problem, wherein are shown axes $x_1$ and $x_2$, representing two sets of control/decision variables. Variable $x_1$ might represent, for example, the tolerances for various components to be manufactured, in which a simple 3-D component is associated with three tolerance variables, one for each dimension. Variable $x_2$ then describes the costs of manufacturing the components as a function of the components' tolerance specifications.

In this setting, the tighter the values of a component's tolerance variables, the better is the degree of precision achieved in the component. But, at the same time, it is more costly to manufacture the component.

The vector $C=(c_1, c_2)$ captures the sensitivity of the two sets of decisions $x_1$ and $x_2$ that can be used to calculate the overall manufacturing design efficiency. The polyhedron P, label 100, describes the set of all feasible $(x_1, x_2)$ values that satisfy all engineering and other design requirements (as specified by the tolerance parameters matrix, $A=[A_{12}, A_{21}]$) to manufacture the components.

The general problem is NP-hard and difficult to resolve in a reasonable time. The usual techniques used in attempting to arrive at a global optimum are Simulated Annealing, Genetic Algorithm or other Monte Carlo type approaches.

However, all of these techniques are slow, cumbersome, and do not guarantee a global solution.

The generalized min-max problem is characterized as a model for scenarios in which there are two conflicting objectives and a concave objective function providing an effectiveness/efficiency metric. Presently, no computerized tool is available that guarantees a global solution to the general min-max problem, let alone a computer tool that can find such solution in a reasonable time.

SUMMARY OF THE INVENTION

In view of the foregoing, and other, exemplary problems, drawbacks, and disadvantages of the conventional methods, it is an exemplary feature of the present invention to provide a computer structure and method for providing a global optimum for applications of the generalized min-max problem.

It is another exemplary feature of the present invention to provide a method in which this global optimum can be located in a reasonable amount of time.

It is another exemplary feature of the present invention to demonstrate a computer tool, as exemplarily implemented specifically in the application for the manufacturing of three-dimensional (3D) parts.

It is another exemplary feature of the present invention to provide a computer tool available to any number of environments that can be described as a min-max problem.

To achieve the above exemplary features and others, in a first exemplary aspect of the present invention, described herein is a method for a computerized method for providing an optimization solution, including, for a process, wherein is defined a linear functional form $y=f(X,c)$, where X comprises a set of independent variables $X=\{x_1, \ldots x_n\}$, c comprises a set of functional parameters $c=\{c_1, \ldots c_n\}$, and y comprises a dependent variable, where the independent variables set X is partitioned into two subsets, $X_1$ and $X_2$, receiving data for said process, minimizing y with respect to $X_1$, and maximizing y with respect to $X_2$, subject to a set of constraints, wherein the maximizing y comprises a global optimum for the process.

In a second exemplary aspect of the present invention, described herein is an apparatus for calculating a global optimization to a minimum-maximum problem, including a first calculator to provide a plurality of minimum values, and a second calculator to locate a global optimum value, given the plurality of minimum values.

In a third exemplary aspect of the present invention, also described herein is a system including a memory containing data appropriate to a minimum-maximum problem and an apparatus further including a first calculator to provide a plurality of minimum values and a second calculator to locate a global optimum value, given the plurality of minimum values.

In a fourth exemplary aspect of the present invention, also described herein is a signal-bearing medium tangibly embodying a program of machine-readable instructions executable by a digital processing apparatus to perform the above method for providing an optimization solution.

In a fifth exemplary aspect of the present invention, also described herein is a business method, including at least one of: executing a computerized calculation to find a global maximum in accordance with the above-described method; providing a data for the process, the data to be used in the computerized calculation for the global optimum; receiving a result from the computerized calculation; providing one or more software modules for the computerized calculation; and developing one or more software modules for the computerized calculation.

In a sixth exemplary aspect of the present invention, also described herein is a computer tool for providing a global solution to a minimum-maximum problem, including a linear programming solver to calculate a periphery of a polyhedron representing a region of all points that satisfy a linear constraint in a minimum-maximum problem.

The present invention, therefore, provides a method that determines a global solution for a generalized min-max problem and a computer tool that will execute the method in a reasonably short time.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 2 shows an overview 200 of an exemplary system in which the present invention is applied to manufactured parts tolerance design;

FIG. 3 shows an exemplary flow chart 300 for the min-max optimization step 204 of FIG. 2;

DETAILED DESCRIPTION OF AN EXEMPLARY EMBODIMENT OF THE INVENTION

Figure 1:
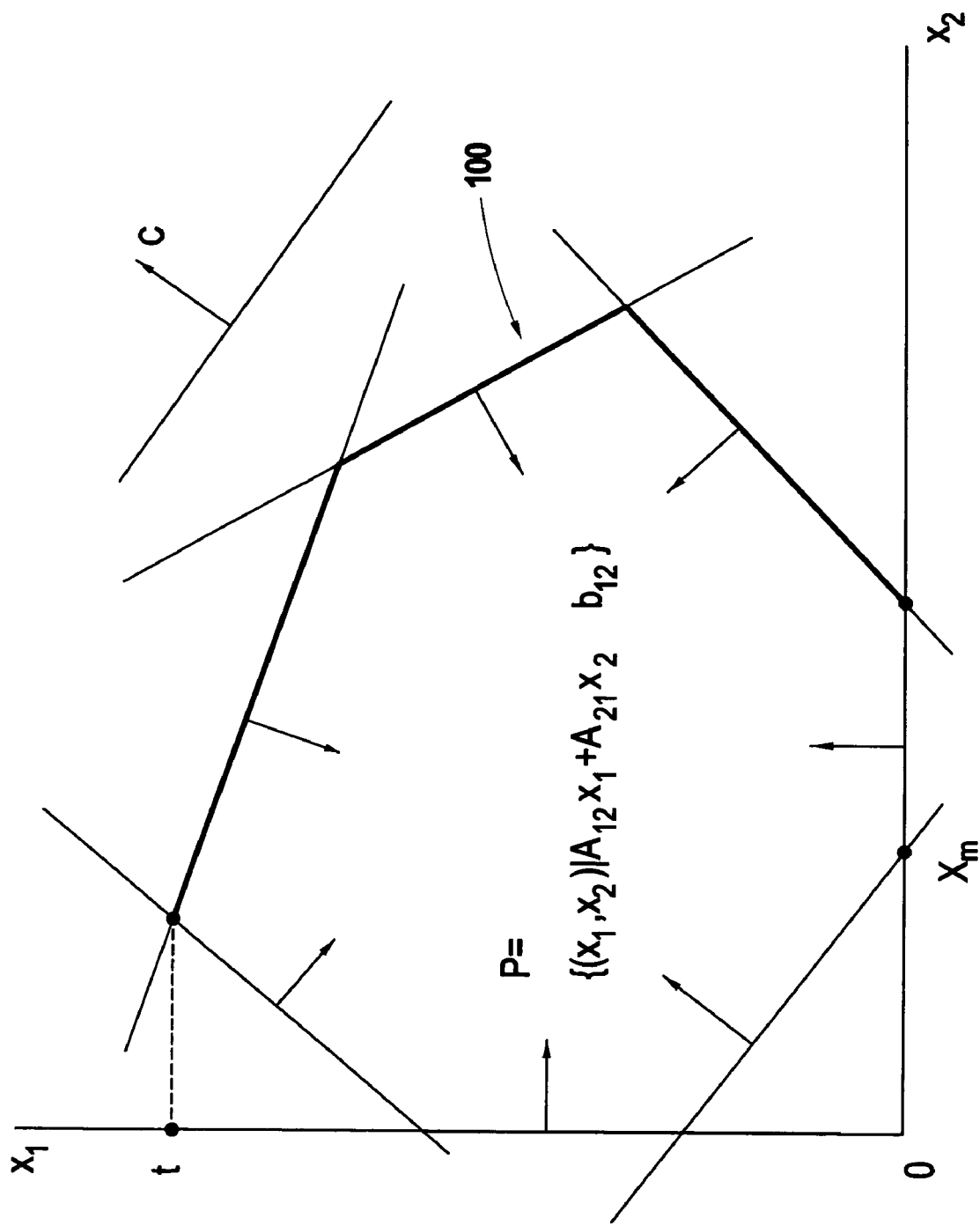
FIG. 1 shows a feasible region (polyhedron) 100 for a general min-max problem.

Referring now to the drawings, and more particularly to FIGS. 1-11, an exemplary embodiment of the computer tool of the present invention will now be discussed in the min-max application of maximizing the tolerance of manufactured parts while minimizing the cost for these parts. One of ordinary skill in the art, taking the following discussion as a whole, will readily recognize that the technique used in this computer tool can easily be adapted to other applications, such as product distribution, supplier/vendor availability and distribution, optimal procurement activities, securities portfolio management, etc.

The tolerancing of 3-D parts in manufacturing design allows the parts designer to directly associate the tolerance data with the native 3-D geometry. Former practices, based on usage of drawings, require the generation of these drawings and lead to lack of integration between the technological data (tolerances) and geometrical 3-D data.

One challenge in coming up with the tolerancing scheme associated with any part is that it must be consistent with the geometry for this part and that it must follow the rules set by the international tolerancing standards (ANSI, ISO, etc.). In the design of parts, there are two conflicting goals:

1) The tolerance values must not be too loose, in order to guarantee that the specifications for the assembly will be reached; and 2) The tolerance values must not be too tight, in order to reduce the manufacturing cost of each part.

In such a problem setting, the computer tool of the present invention aids a parts designer in determining the optimum tolerancing scheme that minimizes the manufacturing costs for all the parts by accommodating for maximum allowable tolerances (e.g., to meet the assembly specifications).

Underlying the computer tool of the present invention is a novel technique that yields a global optimum in the general case of non-convex problem for the set of problems described above. The present invention is cognizant of the aforementioned functional construct shown in FIG. 1. Moreover, the present invention builds upon this known functional construct, but references this known construct to impose upon it novel problems, constraints, and desiderata, of the following illustrative type.

A typical conventional approach to solving this nonlinear problem would be that of parameterizing $x_2$ and evaluating the piecewise linear function g(x) at every choice of $x_2$. The present invention also uses an iterative procedure to solve the min-max problem, but it implements an iterative process in which local minima are first found and then the maximal member among the local minima is located, thereby providing a global optimum.

FIG. 2 shows an exemplary overview 200 of the information flow in the computer tool of the present invention, as applied to be a process for determining optimal parts design.

In FIG. 2, database 201 contains tolerance data for the parts, and database 202 contains data for costs of manufacturing these parts. In step 203, the data for tolerance and costs are provided as inputs into the present invention, and in step 204, the tolerance design problem is solved using a min-max optimization model discussed below to provide an output 205 being the optimal parts design.

FIG. 3 shows an exemplary process 300 to implement the min-max optimization model (e.g., reference step 204 of FIG. 2). Step 301 is the entry into the process, so that, in step 302, the data from the two databases 201,202 are fitted into data structures to populate the min-max model. That is, the data in these two databases 201, 202 would be converted into appropriate data structures, one data structure for cost parameters (c) and one for tolerance parameters (A).

The costs parameters, c, define the sensitivity of the two sets of tolerance decisions $x_1$ and $x_2$ that can be used to calculate the overall efficiency of manufacturing. The tolerance parameters matrix A specifies the engineering and other design requirements that guide the process of obtaining optimal tolerance specifications for all the components.

In step 303, the min-max problem is solved to provide the data to generate the design reports in step 304. It is noted that a number of algorithms could be implemented in software format for this step 303, including a number of known algorithms.

However, as initially mentioned above, the problem with using these known algorithms is that they provide, at best, a local optimum (e.g., they do not guarantee a global optimum). In contrast, the method of the present invention, shown in overview in FIGS. 4 and 5, uses an iterative optimization looping technique that further provides a global optimum.

Figure 4:
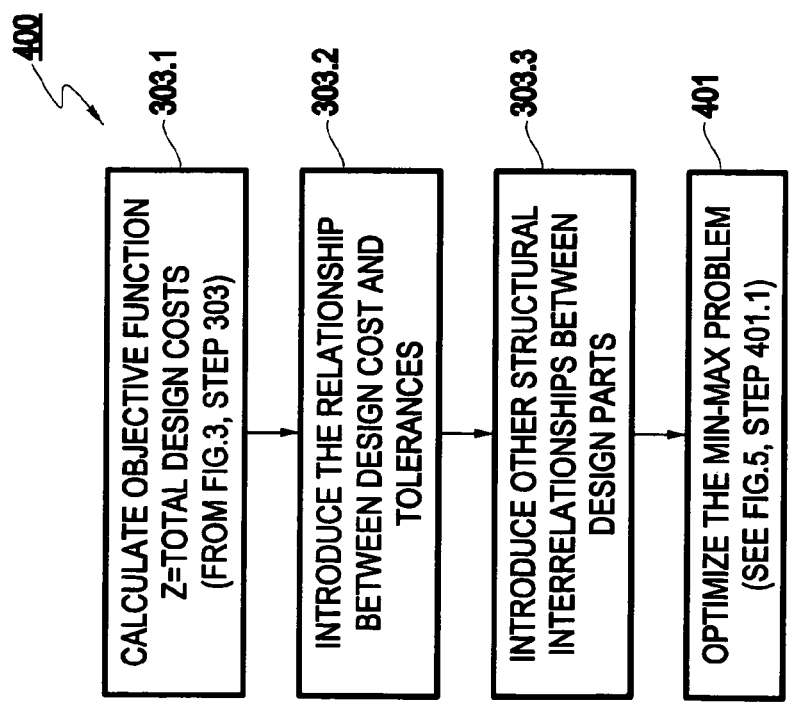
FIG. 4 shows an exemplary flow chart 400 for obtaining the min-max solution step 303 of FIG. 3.

Thus, FIG. 4 shows an exemplary process 400 for step 303 (e.g., solving the min-max problem instance) of FIG. 3. However, as an overview of the novel process of the present invention, it would be helpful to return to FIG. 1 to graphically explain the mathematical process.

As mentioned above, the polyhedron P in FIG. 1 describes the set of all feasible $(x_1, x_2)$ values that satisfy all engineering and other design requirements (as specified by the tolerance parameters matrix, $A=[A_{12}, A_{21}]$) to manufacture the components. Therefore, the min-max solution lies somewhere in the polyhedron P. The technique of the present invention recognizes that the solution actually lies on the periphery of polyhedron P and that the global solution to the min-max problem can be found by "sliding" sensitivity vector C across the polyhedron P to determine which corner point of the polyhedron provides the min-max global solution.

Thus, important contributions of the present invention include a recognition that a computer tool would be able to "construct" the polyhedron P from the data in the tolerance and cost databases. The tool can then systematically test the periphery of the polyhedron P, and more specifically, the corners of the periphery, by constructing "1-polar cuts" by interconnecting corner points of the polyhedron P and using sensitivity vector C to zoom in on the region of the 1-polar cut the solution lies in.

In view of this graphical description and returning to FIG. 4, in step 303.1, the objective function for total design cost is calculated. This step specifies the objective function in terms of a linear equation defined in terms of the cost vector c, and the tolerance decisions x, expressed as $(c_2 x_2 + c_1 x_1)$. In step 303.2, the relationship between design cost and tolerances is introduced, and in step 303.3, any other structural interrelationships between design parts are introduced. In these two steps, the engineering and other design requirements, specified by data items in A, are enforced.

Figure 5:
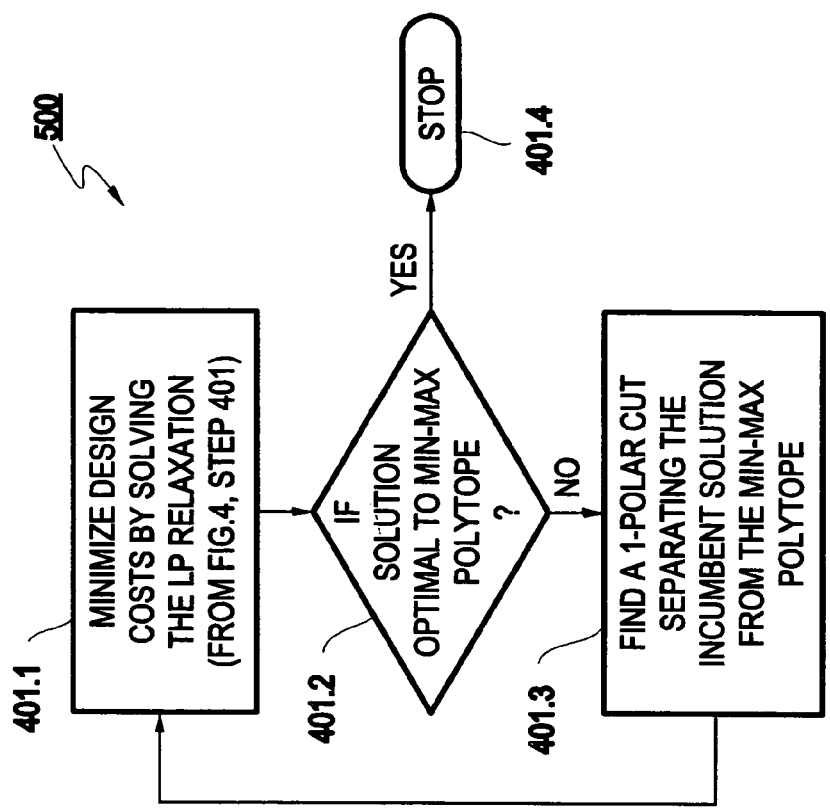
FIG. 5 shows an exemplary flow chart 500 for the min-max problem optimization step 401 of FIG. 4.

Finally, in step 401, the min-max problem is then optimized (e.g., a global optimum is found), using the exemplary looping technique 500 shown in FIG. 5.

In step 401.1 of FIG. 5, the design costs are minimized by solving the LP relaxation. An LP relaxation of the min-max problem (potentially a non-linear mathematical program) refers to the linear programming representation that results by dropping the non-linearities present in the model formulation. There are standard commercially available linear programming (LP) solvers such as CPLEX, OSL, XPRESS, that can be used to solve such an LP relaxation.

In step 401.2, it is determined whether the solution of step 401.1 is optimal, and, if so, the process is stopped in step 401.4. If the solution is not optimal, then in step 401.3, a 1-polar cut that separates the incumbent solution from the min-max polytope is found, and the process returns to step 401.1. This looping continues until the global optimum is located.

Figure 8:
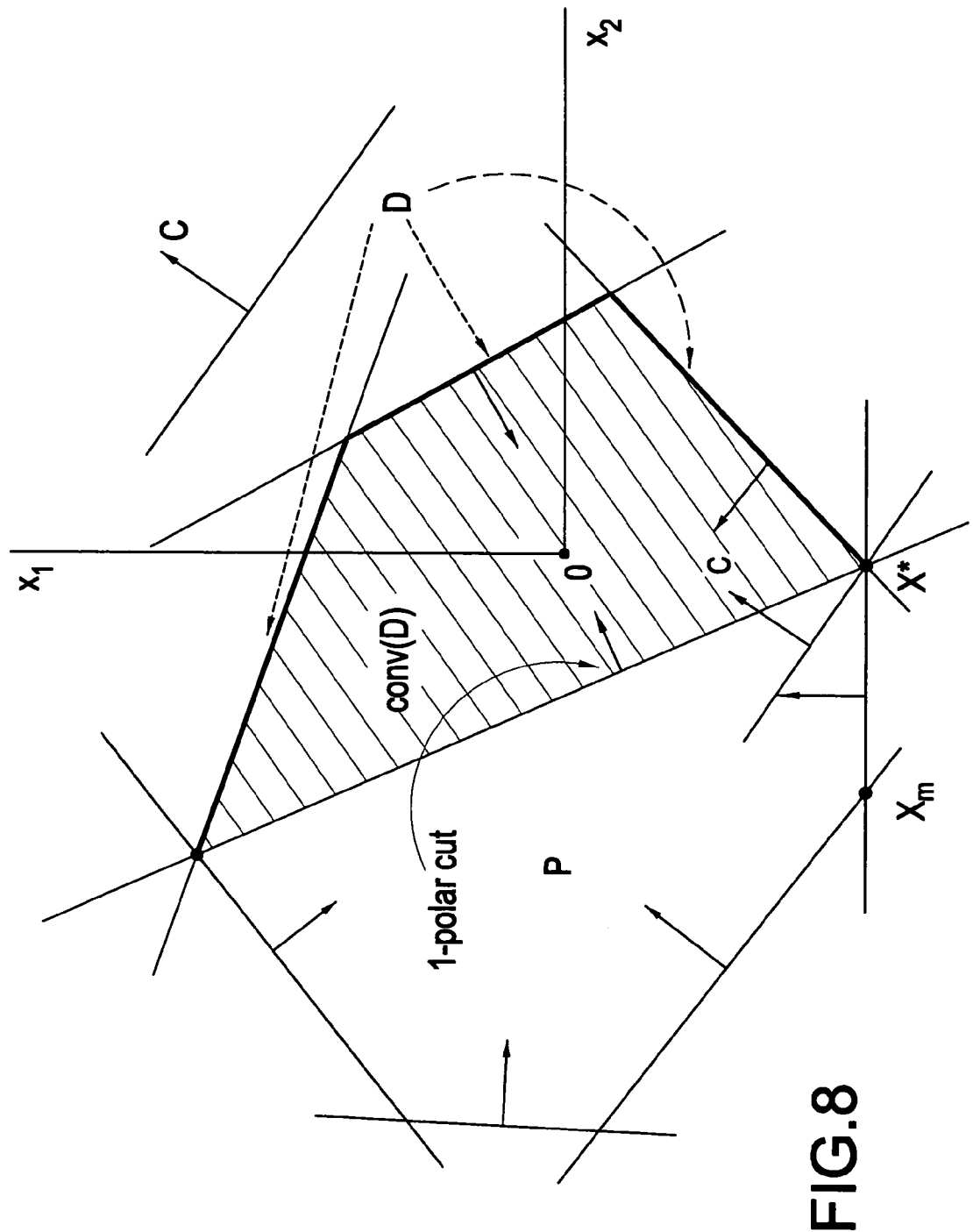
FIG. 8 exemplarily shows a 1-polar cut for conv(D)

A "1-polar cut" is a mathematical construct based on polarity theory (as described in the text book titled Integer Programming and Combinatorial Optimization by Nemhauser and Wolsey (John Wiley and Sons, New York, 1988) that can be computationally generated to obtain an additional characterization for conv(D) as illustrated in FIG. 8, so that local optima can be discarded by this "cut" to proceed towards a global optimum.

Figure 6:
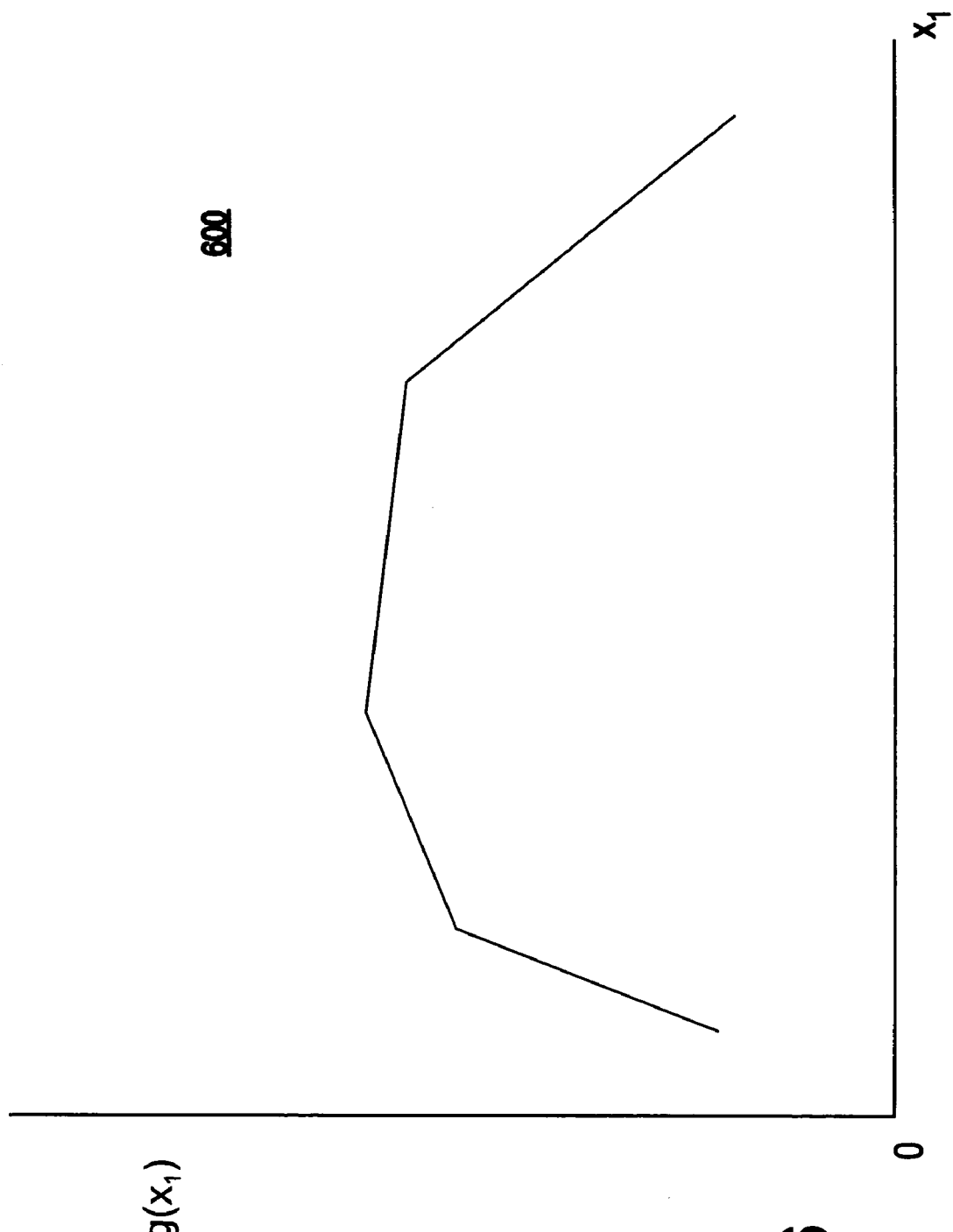
FIG. 6 shows that the objective function to be minimized in the resolution of the min-max problem is a piece-wise linear, concave function, $g(x_2)$ 600.
Figure 7:
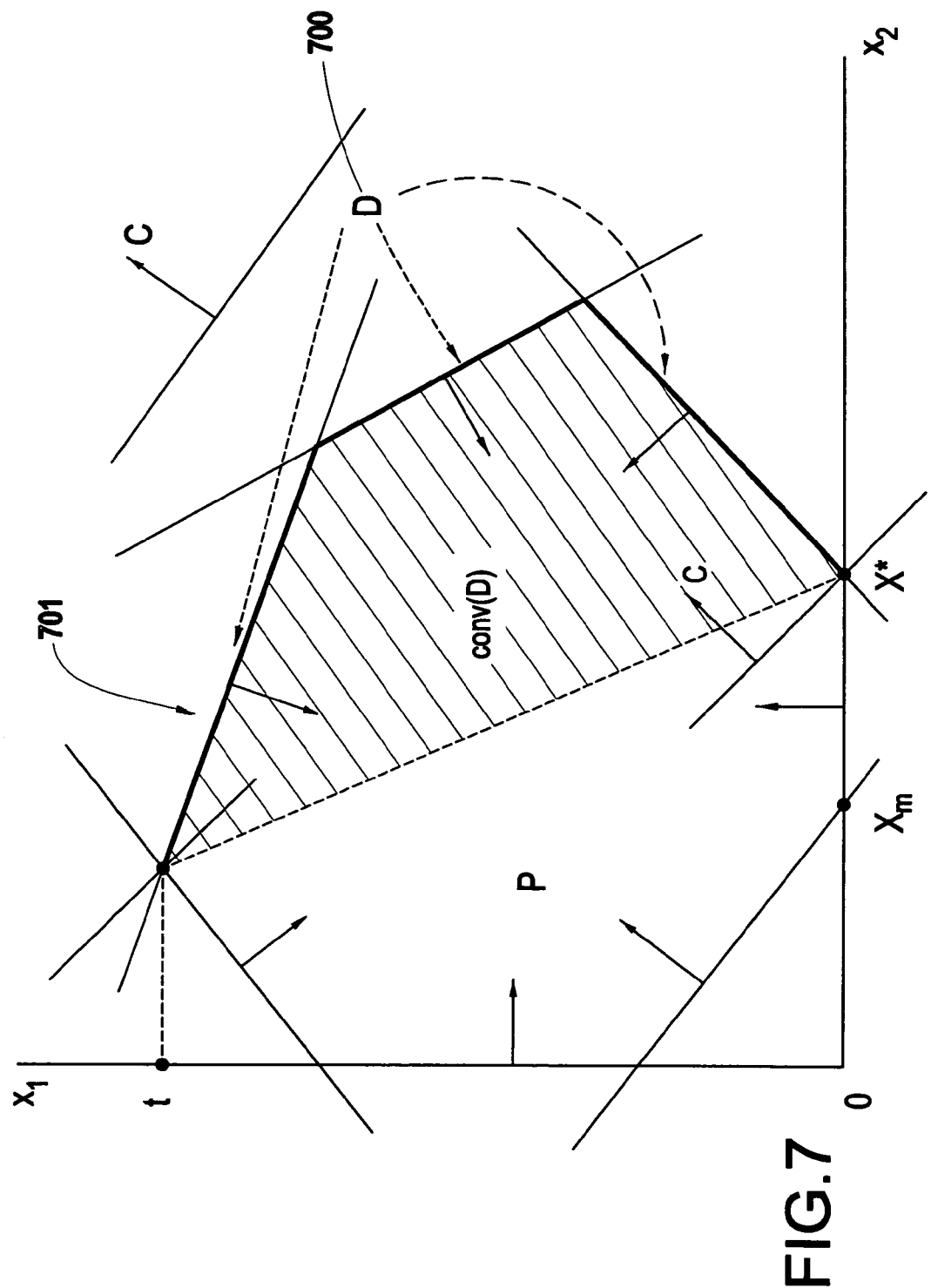
FIG. 7 shows the set of allowable solutions, $D=(x_2, g(x_2))$, and the polyhedron, conv(D), the convex hull of the points in D, as the feasible region associated with the reformulated problem.

FIGS. 6 through 8 illustrate in greater detail the mathematical foundation underlying the computerized method implemented by the present invention.

More specifically, for natural numbers k=1, . . . , Pmaster ($u_k$) is defined as:

$P$master$(u_k)$=Min$\{c_2 x_2 + u_k(b_{12} - A_{21} x_2): A_{12} x_1 + A_{21} x_2 \leq b_{12}\}$.

Psub($x_{2k}$) is defined as the LP problem:

$P$sub$(x_{2k})$=Max$\{c_1 x_1 + c_2 x_{2k} : A_{12} x_1 \leq b_{12} - A_{22} x_{2k}\}$, with associated optimal dual multipliers $u_k$.

Let $zM_k$ be the optimal objective function value of program Pmaster($u_k$) and $zS_k$ be the same for program Psub($x_{2k}$) for k=0, 1, . . .

With these definitions, procedure Local, discussed below, is used to begin to find an optimal solution to the min-max problem. Procedure Local assumes the existence of a known extreme point solution in the polyhedron P. This is not a strong assumption, as a candidate starting solution can always be generated by solving the linear program Pmaster(0).

Procedure Local

Given an initial feasible extreme point solution g(x)=(g($x_1$), g($x_2$)) in P, or, equivalent symbology, $x_g=(x_{1g}, x_{2g})$ in P, the steps of the procedure Local are:

Step 0: Set k=0, $z^M_0 = c_1 x_{1g} + c_2 x_{2g}$, and $x_{20} = x_{2g}$.

Step 1: Solve Psub($x_{2k}$) to obtain $u_k$ and $z^S_k$.

Step 2: Solve Pmaster($u_k$) to obtain $x_{2k+1}$ and $z^M_{k+1}$.

If $z^M_{k+1} \geq z^M_k$ then STOP; else, set k to k+1, go to Step 1.

Steps 1 and 2 above can both be executed using an LP solver. In terms of the exemplary application for parts manufacturing, in step 1, at given tolerance costs, $x_{2k}$, the k-th step results in an intermediate solution associated with the design efficiency value $z^S_k$, and a design efficiency improvement direction, $U_k$, as a recommendation to proceed towards the local optimum. In step 2 above, in the suggested improvement direction, $u_k$, the k-th step finds a better tolerance alternative, $x_{2k+1}$, that is guaranteed to improve upon the incumbent design efficiency value.

The result of Procedure Local is a set of tolerance decisions associated with a design efficiency value, $z^M_k$, that may be improved further.

It can be shown that procedure Local converges to an extreme point solution of P in finitely many steps. However, the solution to which this procedure converges can at best be a local optimum, as can be shown using the following result: g(x) is concave for x in $P_2$ (e.g., see FIG. 6).

Thus, the global optimizer to problem Pmin-max, $x_2^*$, lies on the relative boundary of $P_2$. What this says is that, if any gradient-based search is used to solve the min-max problem Pmin-max, as in FIG. 6, then the solution may be trapped in a local optimum.

Therefore, parameterizing $x_2$ and evaluating g($x_2$) (e.g., equivalent to solving an LP) may not be a viable approach to yield the global optimal solution to Pmin-max. In fact, this "parameterization approach" may not even be able to improve on a given non-optimal initial solution.

In the present invention, in order to overcome this limitation, the min-max problem is reformulated in a manner that permits one to solve the min-max problem to global optimality. This new formulation, in accordance with the present invention, of the min-max problem solves the following problem:

min$\{c_1 x_1 + c_2 x_2 : (x_1, x_2)$ belong to conv(D)$\}$, and this problem can be solved as an LP via successive refinement of the feasible region. The reformulated problem is shown graphically in FIG. 7. Here, D 700 represents the set of all local minima that can be generated by solving an LP relaxation of the min-max problem. Conv(D) 701 represents the convex hull of all such local minima.

Following this reformulation, a global optimum solution is formulated below (e.g., see FIG. 8):

Procedure Global

Given A, $b_{12}$, c, and the definitions of P and D:

Step 0: Solve problem Max $\{c$ x:A $x \leq b_{12}\}$ to obtain an optimal solution $x_M$, and set v to $x_M + c$. Set k=0.

Step 1: Solve problem Min $\{c_x : x$ in P$\}$ to obtain an optimal solution $x_m$ with the associated objective function value $Z_k$.

Step 2: If $x_m$ belongs to D, then STOP. $x_m$ solves Pmin-max. Else, solve the polar problem $P_1$(conv(D), v, $x_m$) to obtain a polar cut $\{s(x-v) \leq 1\}$. Set P to P^$\{x:s(x-v) \leq 1\}$ and k to k+1, and go to Step 1.

It can be shown (e.g., referring to polarity theory literature, such as the text book titled Integer Programming and Combinatorial Optimization by Nemhauser and Wolsey (John Wiley and Sons, New York, 1988), the contents of which are incorporated herein by reference) that the polytope P (defined as a bounded polyhedron) shrinks "strictly" in Step 2 of each iteration in such a way that in each iteration a new optimal solution with a strictly better objective function value is generated. This monotonic behavior leads to the finite convergence of the above described Procedure Global, as shown in the iterative process shown in FIG. 5.

Therefore, the present invention presents a computerized tool that provides a global optimum in any application having the min-max problem characteristic. It is exemplarily demonstrated in the scenario of determining the optimum tolerancing scheme that minimizes the manufacturing costs for all the parts by accommodating for maximum allowable tolerances (e.g., to meet the assembly specifications). However, one of ordinary skill in the art would readily recognize, after having read the present application and taking the concepts herein as a whole, that the computer tool discussed above would be applicable in many other applications.

As non-limiting examples, the present invention might be adapted for a procurement problem in which the goal is to determine the mix of suppliers, given data for quantity discounts. In this application, variables $x_1$ represent the quantities for a given product to be procured from suppliers in different time periods. Variables $x_2$ then describe the supplier costs of procuring as a function of the quantities supplied.

Another scenario might be the optimal portfolio selection, in which variables $x_1$ represent the quantities for a given security to be held in a portfolio over different time periods. Variables $x_2$ then describe the risks of shortfalls as a function of the quantities of securities held.

Yet another scenario might be a health care problem involving survival-time classification of breast cancer patients, in which the goal is to minimize the m-minima of k-linear functions.

Exemplary Hardware Implementation

Figure 9:
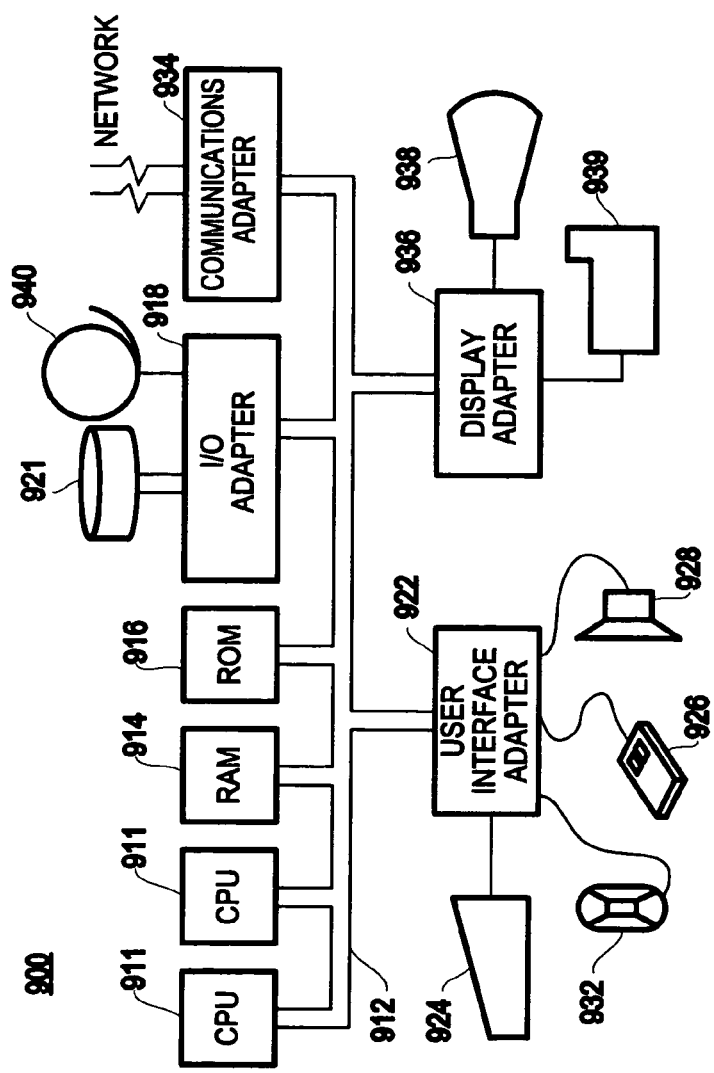
FIG. 9 illustrates an exemplary hardware/information handling system 900 for incorporating the present invention therein.

FIG. 9 illustrates a typical hardware configuration of an information handling/computer system in accordance with the invention and which preferably has at least one processor or central processing unit (CPU) 911.

The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting an information handling system to a data processing network, the Internet, an Intranet, a personal area network (PAN), etc., and a display adapter 936 for connecting the bus 912 to a display device 938 and/or printer 939 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 911 and hardware above, to perform the method of the invention.

This signal-bearing media may include, for example, a RAM contained within the CPU 911, as represented by the fast-access storage for example. Alternatively, the instructions may be contained in another signal-bearing media, such as a magnetic data storage diskette 1000 (FIG. 10), directly or indirectly accessible by the CPU 911.

Whether contained in the diskette 1000, the computer/CPU 911, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

Figure 11:
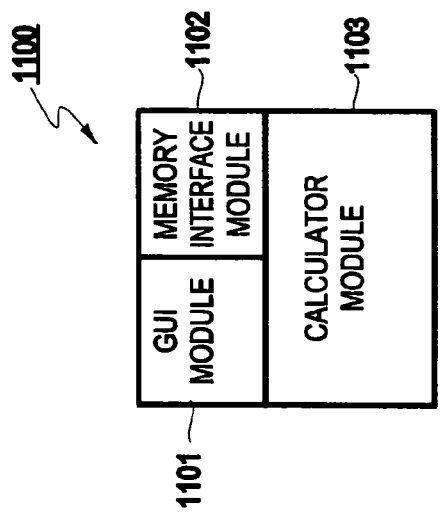
FIG. 11 shows an exemplary block diagram of the software modules for a computer tool that executes and embodies the method described herein.
Figure 10:
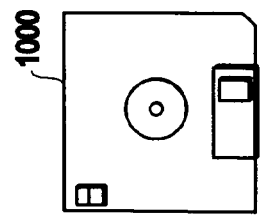
FIG. 10 illustrates a signal bearing medium 1000 (e.g., storage medium) for storing steps of a program of a method according to the present invention.

In yet another aspect of the present invention, FIG. 11 shows an exemplary block diagram 1100 of the software modules for a computer program that might be used in the exemplary system 900.

In FIG. 11, the user would interface with the computer program through the graphic user interface (GUI) 1101 for controlling the execution and for viewing results and/or otherwise providing the results to be stored in a data file, printed out, or exported into another application program. Memory interface 1102 allows the database data to be accessed and intermediate and final results to be stored in memory. Calculator module 1103 includes submodules to convert the database data into the appropriate data structure formats, to execute the local subroutine, and to execute the global subroutine.

In yet another aspect of the present invention, one of ordinary skill in the art, taking the discussion above as a whole, would readily recognize that this computer tool could also be the basis of a business method or service that relies upon some aspect of this tool. Thus, for example, a service might be implemented in the form of a consulting enterprise having the function of reading a database and executing the min-max solution using the computer tool taught in the present invention. This service might even be based on using the Internet as the means of communication between the enterprise and the client and the client's database.

Another possible service based on the present invention might be implemented in the form of a software enterprise having the function of adapting the computer tool for specific applications, such as those mentioned above.

As will be readily recognized by one of ordinary skill in the art, this invention is well suited for modeling and resolving linear optimization problems where there are two conflicting objectives, and there is a well-understood notion of an effectiveness/efficiency metric (to be used as an objective function) that is concave.

While the invention has been described in terms of exemplary embodiments, those skilled in the art will recognize that the invention can be practiced with modification within the spirit and scope of the appended claims.

Further, it is noted that Applicants' intent is to encompass equivalents of all claim elements, even if amended later during prosecution.

Having thus described our invention, what we claim as new and desire to secure by letters Patent is as follows:

1. A computerized method for providing an optimization solution, said method comprising:

for a process to be executed on a computer, wherein is defined a linear functional form y=f(X,c), where X comprises a set of independent variables $X=\{x_1, \ldots x_n\}$, c comprises a set of functional parameters $c=\{c_1, \ldots c_n\}$, and y comprises a dependent variable, where the independent variables set X is partitioned into two subsets, $X_1$ and $X_2$, receiving data for said process;

populating said data into a min-max model, as executed by a processor on said computer;

minimizing y with respect to $X_1$;

maximizing y with respect to $X_2$, subject to a set of constraints, wherein said maximizing y comprises a global optimum for said process; and sending said global optimum to at least one of a display device, a printer, and a memory.

2. The method according to claim 1, further comprising:
reformulating said process as a sequence of linear minimization problems.

3. The method according to claim 2, further comprising:
generating new constraints to refine the problem formulation for said maximizing.

4. The method according to claim 3, wherein the method iteratively adds and manages the newly generated constraints to reoptimize the problem to global optimality.

5. The computerized method of claim 1, wherein said process comprises one of an optimal solution for a:
design of toleranced parts in a manufacturing;
procurement;
product distribution;
supplier/vender availability or distribution;
securities portfolio management;
portfolio selection; and
health care problem.

6. An apparatus for calculating a global optimization for a problem to be optimized, said apparatus comprising:
a receiver to receive data related to said problem, for populating a model for said problem;
a data converter to convert said received data into data structures that thereby populate said model;
a first calculator, as executed by a processor on said apparatus, to provide a plurality of minimum values of said model;
a second calculator, as executed by said processor, to locate a global optimum value for said problem, given said plurality of minimum values; and
a transmission port to send said global optimum to at least one of a display device, a printer, and a memory.

7. The apparatus of claim 6, wherein at least one of said first calculator and said second calculator comprises a linear programming solver.

8. The apparatus of claim 6, wherein said plurality of minimum values comprise minimum values over a first domain of independent variables of a minimum-maximum problem and said global optimum value comprises a maximum value over a second domain of independent variables of said minimum-maximum problem.

9. A system comprising:
a memory containing data appropriate to a problem to be optimized; and
an apparatus comprising:
a data converter, as executed by a processor on said apparatus, to convert said received data into data structures that thereby populate a model for said problem;
a first calculator to provide a plurality of minimum values of said problem data, based on said populated model; and
a second calculator to locate a global optimum value for said problem, given said plurality of minimum values, said global optimum value being sent to at least one of a display device, a printer and a memory device.

10. The system of claim 9, wherein said problem to be optimized comprises a minimum-maximum problem, such that said first plurality of minimum values is over a first domain of independent variables of said minimum-maximum problem and said global optimum value is over a second domain of independent variables of said minimum-maximum problem.

11. A computer program product tangibly embodying a program of machine-readable instructions, which when executed by a digital processing apparatus, perform a method for providing an optimization solution, said method comprising:
for a process, wherein is defined a linear functional form $y=f(X,c)$, where X comprises a set of independent variables $X=\{x_1, \ldots x_n\}$, c comprises a set of functional parameters $c=\{c_1, \ldots c_n\}$, and y comprises a dependent variable, where the independent variables set X is partitioned into two subsets, $X_1$ and $X_2$, receiving data for said process;
populating a min-max model with said data;
minimizing y with respect to $X_1$;
maximizing y with respect to $X_2$, subject to a set of constraints, wherein said maximizing y comprises a global optimum; and
sending said global optimum to at least one of a display device, a printer, and a memory.

12. The computer program product according to claim 11, said method further comprising:
reformulating said process as a sequence of linear minimization problems.

13. The computer program product according to claim 12, said method further comprising:
generating new constraints to refine the problem formulation for said maximizing.

14. The computer program product according to claim 13, wherein the method iteratively adds and manages the newly generated constraints to reoptimize the problem to global optimality.

15. A computer-implemented method, comprising at least one of:
for a process, wherein is defined a linear functional form $y=f(X,c)$, where X comprises a set of independent variables $X=\{x_1, \ldots x_n\}$, c comprises a set of functional parameters $c=\{c_1, \ldots c_n\}$, and y comprises a dependent variable, where the independent variables set X is partitioned into two subsets, $X_1$ and $X_2$, receiving data for said process for a computerized calculation to find a global maximum for said process, said calculation minimizing y with respect to $X_1$ and maximizing y with respect to $X_2$, subject to a set of constraints, wherein said maximizing y locates a global optimum for said process, and sending said global optimum to at least one of a display device, a printer, and a memory;
providing a data for said process, said data to be used in said computerized calculation for said global optimum;
receiving a result from said computerized calculation;
providing one or more software modules for said computerized calculation; and
developing one or more software modules for said computerized calculation.

16. A computerized tool for providing a global solution to a minimum-maximum problem, said tool comprising:
a computer having at least one processor connected to a memory;

a linear programming solver, as executed by a processor on said computer, to calculate a periphery of a polyhedron representing a region of all points that satisfy a linear constraint in a minimum-maximum problem;

a calculator, as executed by said processor, to determine which point on said periphery provides a global solution to said minimum-maximum problem; and a transmitter to send said global solution to at least one of a display device, a printer, and said memory.

17. The computerized tool of claim 16, wherein said linear constraint is $A_{12}x_1 + A_{21}x_2 \leqq b_{12}$, where $A_{12}, A_{21}$ are sub-matrices and $b_{12}$ is a vector, and data is provided for a function $y=f(x,c)=c_1 x_1 + c_2 x_2$, where x is a set of independent variables $x=\{x_1, x_2\}$, $x_1$ and $x_2$ are subsets of x, $c=\{c_1, c_2\}$ is a set of functional parameters, partitioned into two subsets $c_1$ and $c_2$, and y is a dependent variable, said minimum-maximum problem to minimize (over $x_2$) the maximum (over $x_1$) of y, subject to said linear constraint.

18. The computer tool of claim 16, further comprising:
a data converter to fit data from a database into a data structure to populate a model for said minimum-maximum problem.

19. The computer tool of claim 16, further comprising:
a linear programming solver to determine a sensitivity vector C that defines an efficiency between said minimum and maximum parameters.

20. The computer tool of claim 19, further comprising:
a calculator to determine which point on said periphery provides a global solution to said minimum-maximum problem, using said sensitivity vector C.

21. The computer tool of claim 20, further comprising:
a calculator to calculate a 1-polar cut to divide said polyhedron into two regions and to determine which of said two regions said global solution lies, using said sensitivity vector C.

* * * * *